No. 887,144. PATENTED MAY 12, 1908.
S. STOFFEL.
SECTIONAL WHEEL FOR POWER TRANSMISSION.
APPLICATION FILED AUG. 9, 1907.

2 SHEETS—SHEET 1.

Witnesses:
N. S. Austin
F. E. Sheehy

Inventor:
Simon Stoffel
by Joshua R. H. Potts
Atty.

No. 887,144. PATENTED MAY 12, 1908.
S. STOFFEL.
SECTIONAL WHEEL FOR POWER TRANSMISSION.
APPLICATION FILED AUG. 9, 1907.

2 SHEETS—SHEET 2.

Witnesses:
Inventor:
Simon Stoffel
by Joshua R. H. Potts
Att'y

UNITED STATES PATENT OFFICE.

SIMON STOFFEL, OF WEST McHENRY, ILLINOIS.

SECTIONAL WHEEL FOR POWER TRANSMISSION.

No. 887,144.

Specification of Letters Patent.

Patented May 12, 1908.

Application filed August 9, 1907. Serial No. 387,788.

*To all whom it may concern:*

Be it known that I, SIMON STOFFEL, a citizen of the United States, residing at West McHenry, in the county of McHenry, and State of Illinois, have invented certain new and useful Improvements in Sectional Wheels for Power Transmission, of which the following is a specification.

My invention relates to power transmission wheels and has particular reference to the rims of sectional power transmission or gear wheels.

It frequently happens that one or more teeth of a gear wheel are broken or mutilated to such an extent as to make the wheel practically useless. This is particularly the case with the transmission and differential gears on motor vehicles and occasions considerable annoyance inasmuch as when such an accident occurs, the gearing has to be taken completely apart and the broken gear replaced with a perfect one.

The object of my invention is to provide a gear wheel rim which may be detachably secured to any suitable wheel or pulley to transform the same into a gear wheel of the character desired.

A further object is to provide a sectional rim adapted to be detachably secured to the periphery of a wheel to the end that the rim or any portion thereof may be replaced when mutilated, without removing or disturbing the alinement of the wheel or its shaft.

Further objects will appear hereinafter.

Figure 1:
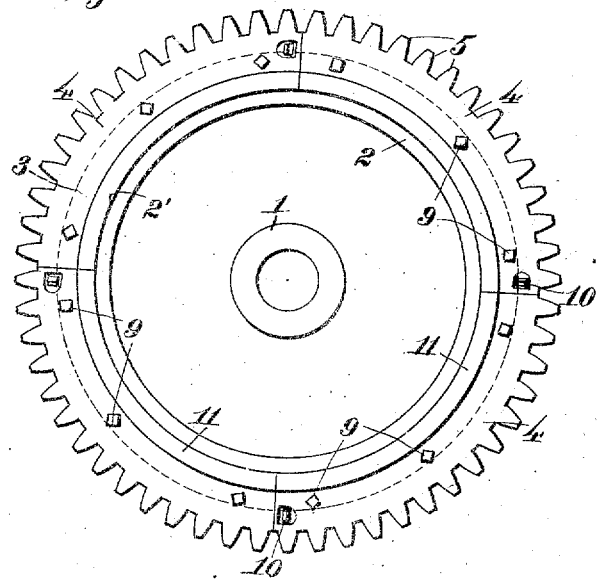
Figure 2:
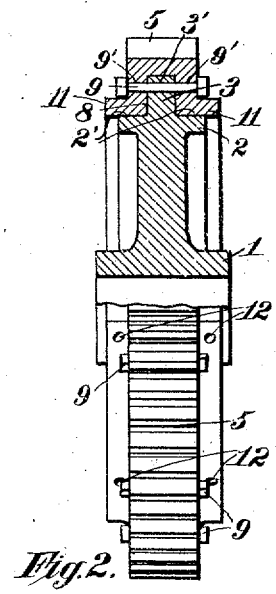
Figure 3:
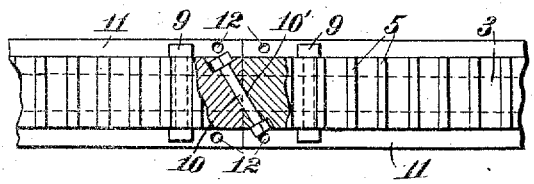
Figure 4:
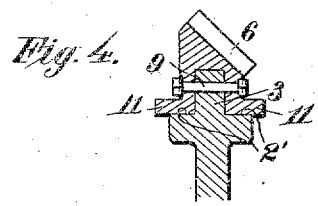
Figure 5:
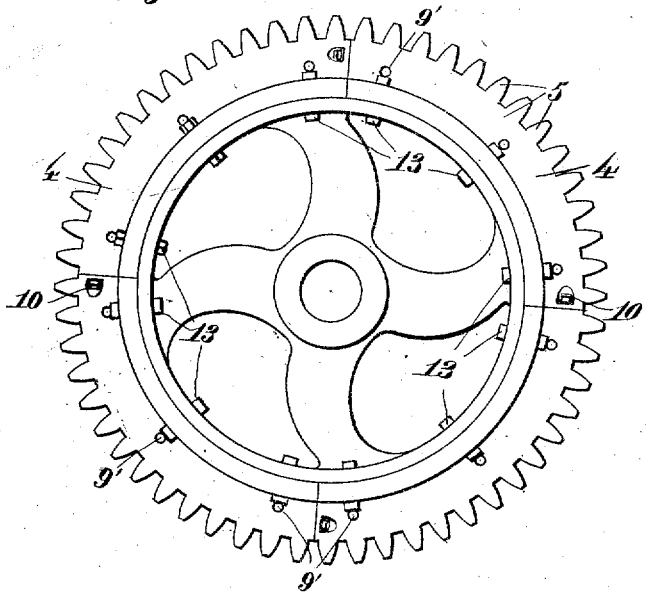
Figure 6:
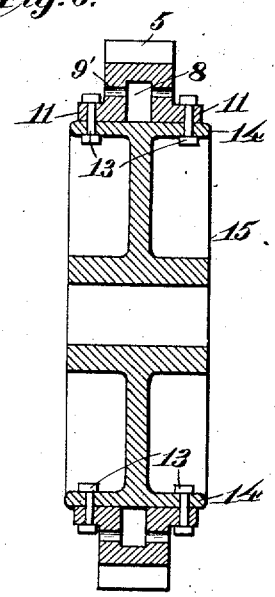
Figure 8:
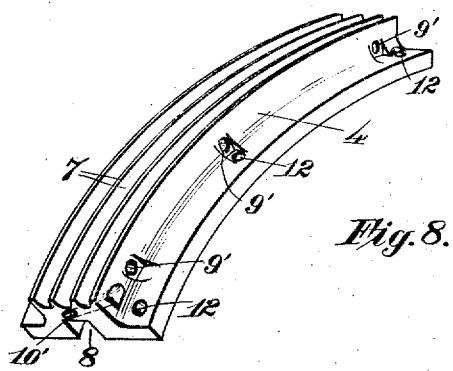
Figure 7:
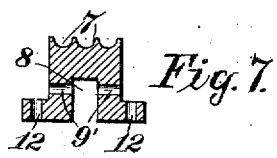

My invention will be more readily understood by reference to the accompanying drawings forming a part of this specification and in which, Figure 1 is a side elevation of a wheel equipped with a sectional rim embodying my invention in its preferred form, Fig. 2 is a face view partly in section of the wheel shown in Fig. 1, Fig. 3 is a detail face view of the rim illustrating one manner of connecting the abutting ends of the sections, Fig. 4 is a detail section of a rim embodying my invention and illustrating the same as constructed to form a bevel or miter gear, Fig. 5 is a view similar to Fig. 1 illustrating the rim secured to a wheel or pulley having the ordinary flat periphery, Fig. 6 is a sectional view of the wheel shown in Fig. 5, Fig. 7 is a detail sectional view of the rim constructed with grooves to form a pulley for rope gearing and Fig. 8 is a perspective view of one section of the rim.

Referring to Figs. 1 and 2 of the drawings, 1 indicates the hub and 2 the periphery of a wheel, which, when equipped with my novel detachable, sectional rim, is particularly adapted for use as the body of a transmission or differential gear of a motor vehicle. The periphery, 2 has a substantially flat face 2' and is provided with an annular rim or flange, 3 to which the rim is secured. Although, when using the gear for the purpose mentioned, I prefer the construction of the wheel body as shown and described, the body may be formed in any preferred manner.

The rim comprises a plurality of similar segmental sections, 4 having a gear surface formed on the outer face. This may take the form of the spur gear teeth, 5 shown in Figs. 1, 2, 3, 5 and 6; the bevel gear teeth shown in Fig. 4; or the grooved face, 7, illustrated in Figs. 7 and 8. The sections are provided with a longitudinal groove, 8, when a wheel body having the annular flange, 3 is used. However, when the rim is to be used upon a wheel having a flat periphery, the rim may or may not be formed with the groove, 8, as desired. When such a flange is provided the sections of the rim are secured thereto by a plurality of bolts, 9 which pass through bolt holes 9' in the rim and holes 3' in the flange, 3. To secure the abutting ends of the sections together, I provide a bolt, 10 passing through diagonally arranged bolt holes, 10' in the adjacent ends as shown in Fig. 3.

The base of the rim sections, 4, are provided with flanges, 11 extending laterally therefrom. These form a broad surface to rest upon the face, 2', giving additional rigidity to the wheel and also affording means whereby the rim may be secured to a flat rimmed wheel, as shown in Figs. 5 and 6. To this end the flanges, 11 are provided with bolt holes, 12, to receive the bolts, 13 whereby the rim is secured to the flange or rim, 14, of the wheel or pulley, 15. It is obvious that the rim described may be secured to any pulley or almost any wheel to transform the same into a gear of the character desired, whether for spur, bevel or rope gearing. Also it is obvious that if one portion of the rim is mutilated or injured, the small section containing the broken part may be quickly removed and a perfect section applied in its place without disturbing the alinement of the wheel or its shaft.

In Fig. 8 I have shown a perspective view of one section of the rim. In this figure I have illustrated the gear face grooved to form a pulley such as is used for rope gearing. Otherwise the section is identical with those used for spur or bevel gearings.

A further and particular advantage of this wheel rim lies in the fact that the dimensions of the gear wheel may be varied in order to vary the power or speed of the shaft without removing the wheel body or disturbing the alinement of either the wheel or its shaft. This is accomplished by varying the radial dimension of the body portion 4 of the segments.

Having described my invention what I claim as new and desire to secure by Letters Patent is:

1. In a device of the class described, a wheel body, in combination with a rim detachably secured thereto, said rim being formed of a plurality of sections each comprising a body portion having a suitable gear face, means for attaching said sections to the periphery of said wheel body and bolts passing diagonally through the adjacent abutting ends of said sections, substantially as described.

2. In a device of the class described, a wheel body, having a flat periphery and an annular flange extending from the center of said periphery, in combination with a rim detachably secured thereto, said rim being formed of a plurality of sections each comprising a body portion having a suitable gear face, a groove to receive said annular flange, and flanges extending laterally from said body portion and resting against said flat periphery upon each side of said annular flange, and bolts passing through said body portion and said annular flange, substantially as described.

3. A detachable wheel rim comprising a plurality of similar segmental sections adapted to be secured to the periphery of a wheel body, each said section comprising a body portion having a suitable gear face, and a longitudinal groove, and flanges extending laterally from said body portion, said body and said flanges each being provided with a plurality of bolt holes, substantially as described.

4. A detachable wheel rim comprising a plurality of similar segmental sections adapted to be secured to the periphery of a wheel body, each said section comprising a body portion having a suitable gear face, and a longitudinal groove, and flanges extending laterally from said body portion, said body portion having a plurality of transverse bolt holes intermediate of its ends and diagonal bolt holes in said ends, and said flanges having a plurality of radial bolt holes, substantially as and for the purpose described.

In testimony whereof I have signed my name to this specification in the presence of two subscribing witnesses.

SIMON STOFFEL.

Witnesses:
A. W. THOMSON,
H. F. LILLIS.